Dec. 21, 1937.  A. E. CLAUDEL  2,102,993
SODA SPREADING MACHINE
Filed Jan. 22, 1936
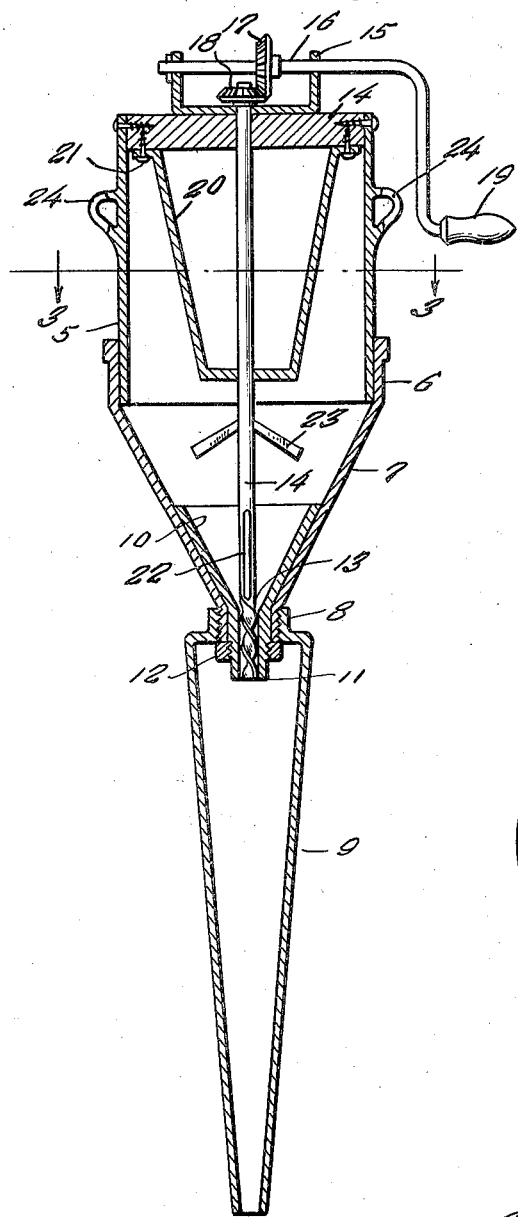
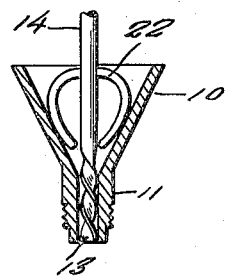
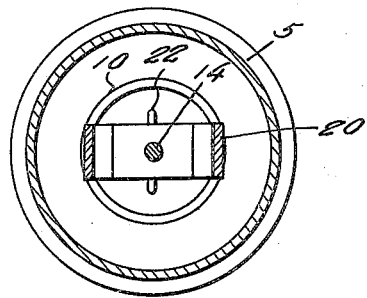
Inventor
Andre E. Claudel
By Clarence A. O'Brien
Hyman Berman
Attorneys Patented Dec. 21, 1937

2,102,993

UNITED STATES PATENT OFFICE 2,102,993

SODA-SPREADING MACHINE

André E. Claudel, St. Bernard, La.

Application January 22, 1936, Serial No. 60,293

2 Claims. (Cl. 221—119)

This invention appertains to new and useful improvements to a fertilizer dispensing apparatus which is especially adapted for dispensing soda as a fertilizer for plants and other growths.

The principal object of the present invention is to provide a dispenser of the character stated which can be conveniently carried about by the workman and from which the material can be dispensed in an easy and efficient manner.

Another important object of the invention is to provide a dispenser of the character stated wherein the parts are constructed in such a manner as to be positive acting and not susceptible to the ready development of defects.

Another important object is to provide a dispenser for fertilizers which can be used for accurately placing the fertilizer, whether it be soda or some other substance, at the base of plants and other growing things.

These and various other important objects and advantages of the invention will become apparent to the reader of the following specification.

In the drawing:

Figure 1 represents a longitudinal sectional view through the invention.

Figure 2 is a vertical sectional view through the conical cup with the screw and lower agitator therein.

Figure 3 is a section on line 3—3 of Figure 1.

Referring to the drawing wherein like numerals designate like parts, the preferred embodiment of my invention is shown in Figures 1 to 3, inclusive. This form of the invention discloses the cylindrical-shaped shell 5 which at its lower end slips into the upper cylindrical portion 6 of the cone 7, which is provided with a reduced externally threaded cylindrical end portion engaged into the internally threaded collar portion 8 of the elongated conical-shaped nozzle 9.

A conical-shaped cup 10 is provided with a cylindrical barrel extension 11 at its small end which depends through the cylindrical extension of the cone 7 and is threaded to accommodate the nut 12 which is capable of being jammed against the lower end of the threaded extension of the cone 7 to secure the cup 10 firmly in place. The barrel-like extension 11 serves to snugly receive the screw end 13 of the shaft 14 which is journaled through the top wall 14 of the shell 5. A U-shaped bearing 15 has the shaft 16 journaled through the upstanding leg portion thereof and this shaft 16 has a bevel gear 17 thereon meshing with the bevel gear 18 on the upper end of the shaft 14. One end of this shaft 16 is provided with the crank and handle 19. Numeral 20 represents an internal bearing for the shaft 14 which is in the form of a U-shaped strap member having upwardly diverged leg members secured by screws at their upper ends as at 21 to the under side of the top 14. The bight portion of the bearing 20 is provided with an opening for snugly receiving the shaft 14.

The lower portion of the shaft 14 just above the screw 13 is provided with outwardly extending agitating arms 22 which are curved downwardly so as to barely miss the side wall of the cup 10. Outwardly radiating agitating arms 23 are provided on the shaft 14 immediately under the bearing 20.

Apertured ears 24 are provided on the shell 5 so that the ends of a strap can be connected thereto and be disposed over the shoulder of the workman, thus affording a support to the apparatus as it is being used.

Obviously, with the fertilizer or soda in the hopper 7 and shell 5, rotation of the shaft 16 will result in the agitation of the material in the cone 7 and the gradual feeding of the same through the barrel 11 by the screw 13. As it drops into the nozzle 9, it will readily flow out to whatever point on the ground the nozzle is pointed to.

Having described the invention, what is claimed as new is:

1. A fertilizer distributor comprising a container of sectional construction, said container consisting of a shell section and a conical-shaped bottom section, said bottom section having a cylindrical extension for snugly receiving one end of the shell, a closure at the opposite end of the shell, a shaft journaled through the closure and provided with manually controlled operating means at its outer end and means on the shaft at the inside of the container for mixing and treating material from the container through the conical-shaped bottom thereof, a cup-shaped structure in the lower portion of the conical-shaped section, said cup-shaped structure having a bushing-like extension, said conical-shaped section having an opening at its apex for receiving the bushing-like extension and means at the outer end of the bushing-like extension for preventing inward movement of the cup-shaped structure with respect to the bottom section.

2. A fertilizer dispenser comprising a container, a shaft extending into the container and provided with operating means therefor at its outer end, said container having a discharge opening, a funnel-shaped wear-resisting shell for disposition in the container, the spout portion of the funnel-like structure projecting through the discharge opening, said shaft having an agitating member on the shaft within the confines of the flared portion of the funnel-like structure, and a thread formation on the shaft within the spout portion of the funnel-like structure.

ANDRÉ E. CLAUDEL.